United States Patent
Klotz

(10) Patent No.: US 10,614,142 B2
(45) Date of Patent: *Apr. 7, 2020

(54) PERSONALIZED SEARCH RESULTS

(71) Applicant: Samsung Electronics Co., Ltd., Suwon-si, Gyeonggi-do (KR)

(72) Inventor: Leigh Klotz, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

This patent is subject to a terminal disclaimer.

(21) Appl. No.: 15/664,541

(22) Filed: Jul. 31, 2017

(65) Prior Publication Data

US 2017/0329857 A1 Nov. 16, 2017

Related U.S. Application Data

(63) Continuation of application No. 14/288,058, filed on May 27, 2014, now Pat. No. 9,721,021.

(51) Int. Cl.
*G06F 7/00* (2006.01)
*G06F 17/00* (2019.01)
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC .................. G06F 17/30867; G06F 17/3053
USPC ....................................................... 707/706
See application file for complete search history.

(56) References Cited

U.S. PATENT DOCUMENTS

| 7,827,170 B1 | 11/2010 | Horling et al. | |
| 8,370,428 B1 * | 2/2013 | Bayliss | H04W 4/50 709/203 |
| 2004/0004731 A1 * | 1/2004 | Itagaki | H04N 1/60 358/1.9 |
| 2006/0026119 A1 * | 2/2006 | Mirrashidi | G06F 16/68 |

(Continued)

OTHER PUBLICATIONS

Bloom filter calculator: <http://hur.st/bloomfilter>, accessed on May 26, 2014.

(Continued)

*Primary Examiner* — Binh V Ho
(74) *Attorney, Agent, or Firm* — Jefferson IP Law, LLP

(57) ABSTRACT

The disclosure relates to personalizing search results based on the device features of a user device. An example method for personalizing search results includes receiving an encoded device profile indicating the device features of the device. The device features indicate one or more native applications installed on the device. The device features may further indicate native applications recently executed by the device, native applications that have been deleted from the user device, and/or web applications recently accessed by the user device. The method further includes identifying the device features of the device based on the encoded device profile, receiving a search query from the device, and performing an application search based on the search query to identify a consideration set of records. The method further includes adjusting the consideration set based on the device features and generating search results based on the adjusted consideration set.

1 Claim, 8 Drawing Sheets

(56) References Cited

U.S. PATENT DOCUMENTS

| | | | |
|---|---|---|---|
| 2007/0016638 A1* | 1/2007 | Elbury | G06F 8/65 709/201 |
| 2007/0021108 A1* | 1/2007 | Bocking | H04M 1/72563 455/414.1 |
| 2007/0180354 A1* | 8/2007 | Rivers-Moore | G06F 17/2247 715/205 |
| 2008/0195588 A1 | 8/2008 | Kim et al. | |
| 2010/0167696 A1* | 7/2010 | Smith | H04W 8/183 455/411 |
| 2010/0217690 A1* | 8/2010 | Lee | G06Q 30/0601 705/26.1 |
| 2010/0281102 A1* | 11/2010 | Chinta | G06F 21/53 709/203 |
| 2011/0208801 A1* | 8/2011 | Thorkelsson | H04L 67/2814 709/203 |
| 2012/0021774 A1* | 1/2012 | Mehta | H04W 4/021 455/456.3 |
| 2012/0239519 A1* | 9/2012 | Wu | G06Q 30/06 705/26.3 |
| 2012/0278406 A1* | 11/2012 | Meisels | H04L 51/08 709/206 |
| 2012/0323876 A1* | 12/2012 | Lymberopoulos | G06F 16/9535 707/706 |
| 2013/0046979 A1* | 2/2013 | Karp | G06F 21/34 713/168 |
| 2013/0111592 A1* | 5/2013 | Zhu | G06F 21/577 726/25 |
| 2013/0173637 A1* | 7/2013 | Kim | G06F 16/27 707/748 |
| 2013/0290318 A1 | 10/2013 | Shapira et al. | |
| 2013/0290319 A1 | 10/2013 | Glover et al. | |
| 2013/0290321 A1* | 10/2013 | Shapira | G06F 16/9535 707/723 |
| 2013/0290322 A1 | 10/2013 | Prosnitz et al. | |
| 2013/0290344 A1 | 10/2013 | Glover et al. | |
| 2013/0339334 A1* | 12/2013 | Brown | G06F 16/9535 707/706 |
| 2013/0339472 A1* | 12/2013 | Ruellan | H04L 67/2842 709/214 |
| 2014/0006409 A1 | 1/2014 | Prosnitz et al. | |
| 2014/0074915 A1* | 3/2014 | Neill | G06F 9/44505 709/203 |
| 2014/0201767 A1* | 7/2014 | Seiden | H04N 21/44218 725/12 |
| 2014/0248864 A1* | 9/2014 | Rangarajan | H04W 4/50 455/418 |
| 2014/0250433 A1* | 9/2014 | Stekkelpak | G06F 9/44505 717/176 |
| 2014/0282480 A1* | 9/2014 | Matthew | G06F 8/60 717/172 |
| 2015/0013013 A1* | 1/2015 | Li | G06F 21/6245 726/26 |
| 2015/0220943 A1* | 8/2015 | Dossick | G06Q 30/0201 705/7.29 |
| 2015/0317559 A1* | 11/2015 | Cronin | G06F 3/0482 706/46 |
| 2016/0021215 A1* | 1/2016 | Spencer | G06F 8/54 717/115 |

OTHER PUBLICATIONS

B. H. Bloom. Space-time trade-offs in hash coding with allowable errors. Communications of the ACM, 13(7), 1970.

Base91 Encoder Sample Code: <https://github.com/aberaud/base91-python>, accessed May 26, 2014.

Cache-, Hash- and Space-Efficient Bloom Filters: <http://algo2.iti.kit.edu/singler/publications/cacheefficientbloomfilters-wea2007.pdf>, accessed on May 26, 2014.

<http://en.wikipedia.org/wiki/Bloom-filter>, accessed on May 26, 2014.

<http://blog.twitter.com/2011/engineering-behind-twitter%E2%80%99s-new-search-experience>, accessed on May 26, 2014.

International Search Report and Written Opinion for related WO Application No. PCT/US2015/032119 dated Jul. 30, 2015.

PCT International Preliminary Report on Patentability for PCT Application No. PCT/US2015/032119, dated Dec. 8, 2016, 8 pages.

* cited by examiner

//PERSONALIZED SEARCH RESULTS

CROSS-REFERENCE TO RELATED APPLICATIONS

This application is a continuation of U.S. patent application Ser. No. 14/288,058 filed May 27, 2014 (now U.S. Pat. No. 9,721,021). The entire disclosure of the application referenced above is incorporated by reference.

FIELD

This disclosure relates to personalizing search results based on a device profile of user device.

BACKGROUND

Search engines are becoming a primary service for accessing information using the Internet. In addition to web pages, users are increasingly turning to special purpose applications to obtain sought after information. Thus, there is an ever growing demand for applications that perform specific functionalities.

SUMMARY

One aspect of the disclosure provides a method for personalizing search results based on the device features of a user device. The method includes receiving an encoded device profile indicating device features of the user device by a processing device. The device features at least indicate one or more native applications installed on the user device. In some implementations, the device features further include a list of native applications recently executed by the user device, a list of native applications that have been deleted from the user device, and/or a list of web applications recently accessed by the user device. The method further includes identifying the device features of the user device based on the encoded device profile, receiving a search query from the user device, and performing an application search based on the search query to identify a consideration set of records. The method further includes adjusting the consideration set based on the device features to obtain an adjusted consideration set and generating search results based on the adjusted consideration set.

According to some implementations, the encoded device profile includes a Bloom filter having a plurality of Boolean values stored at a plurality of index addresses thereof. The Bloom filter can indicate the device features of the user device. In some of these implementations, recreating the device profile includes obtaining a list of potential applications and for each potential application identified in the list of potential applications: i) feeding an application identifier of the potential application into a hash procedure to obtain k index addresses; ii) querying the Bloom filter at the k indexes addresses; and iii) selectively adding the application identifier to the device features of the user device based on the checking. The value of k is an integer greater than one.

In some implementations of the method, the consideration set indicates a plurality of application records obtained from an application datastore. The plurality of application records indicate applications that are relevant to the search query. Additionally or alternatively, the consideration set can indicate a plurality of application state records obtained from an application state datastore. In these implementations, the plurality of application state records indicate states of one or more records that are relevant to the search query. According to some implementations, adjusting the consideration set includes for each record in the consideration set i) determining a result score of the record based on one or more features of the record and one or more features of the query and ii) selectively boosting the result score based on the device features of the user device. The records may be ranked in the consideration set based on the respective result scores thereof. According to other implementations, adjusting the consideration set includes for each record in the consideration set determining a result score of the record based on one or more features of the record, one or more features of the query, and the device features of the user device. The records may be ranked in the consideration set based on the respective result scores thereof.

According to some implementations, the method further include receiving a request to initiate a search session from the user device initiating the search session, assigning a session identifier to the search session, and associating the session identifier to the device features of the user device. In some of these implementations, the session identifier is used to retrieve the device features of the user device when the search query is received from the user device and when subsequent search queries are received from the user device. In some implementations the method includes storing the identified device features of the user device in a recreated device profile.

According to another aspect of the disclosure, a search engine includes a storage device including one or more computer readable mediums and a processing device executing computer readable instructions. The computer readable instructions, when executed by the processing device, cause the processing device to receive an encoded device profile indicating device features of a user device. The device features at least indicate one or more native applications installed on the user device. In some implementations, the device features further include a list of native applications recently executed by the user device, a list of native applications that have been deleted from the user device, and/or a list of web applications recently accessed by the user device. The computer readable instructions further cause the processing device to identify the device features of the user device based on the encoded device profile, receive a search query from the user device, and perform an application search based on the search query to identify a consideration set of records. The computer readable instructions further cause the processing device to adjust the consideration set based on the device features to obtain an adjusted consideration set and generate search results based on the adjusted consideration set.

According to some implementations, the encoded device profile includes a Bloom filter having a plurality of Boolean values stored at a plurality of index addresses thereof. The Bloom filter can indicate the device features of the user device. In some of these implementations, recreating the device profile includes obtaining a list of potential applications and for each potential application identified in the list of potential applications: i) feeding an application identifier of the potential application into a hash procedure to obtain k index addresses; ii) querying the Bloom filter at the k indexes addresses; and iii) selectively adding the application identifier to the device features of the user device based on the checking. The value of k is an integer greater than one.

In some implementations of the search engine, the consideration set indicates a plurality of application records obtained from an application datastore. The plurality of application records indicate applications that are relevant to the search query. Additionally or alternatively, the consideration set can indicate a plurality of application state records obtained from an application state datastore. In these implementations, the plurality of application state records indicate states of one or more records that are relevant to the search query. According to some implementations, adjusting the consideration set includes for each record in the consideration set i) determining a result score of the record based on one or more features of the record and one or more features of the query and ii) selectively boosting the result score based on the device features of the user device. The records may be ranked in the consideration set based on the respective result scores thereof. According to other implementations, adjusting the consideration set includes for each record in the consideration set determining a result score of the record based on one or more features of the record, one or more features of the query, and the device features of the user device. The records may be ranked in the consideration set based on the respective result scores thereof.

According to some implementations, the computer readable instructions further cause the processing device to receive a request to initiate a search session from the user device initiate the search session, assign a session identifier to the search session, and associate the session identifier to the device features of the user device. In some of these implementations, the session identifier is used to retrieve the device features of the user device when the search query is received from the user device and when subsequent search queries are received from the user device. In some implementations, the computer readable instructions further cause the processing device to store the identified device features of the user device in a recreated device profile.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
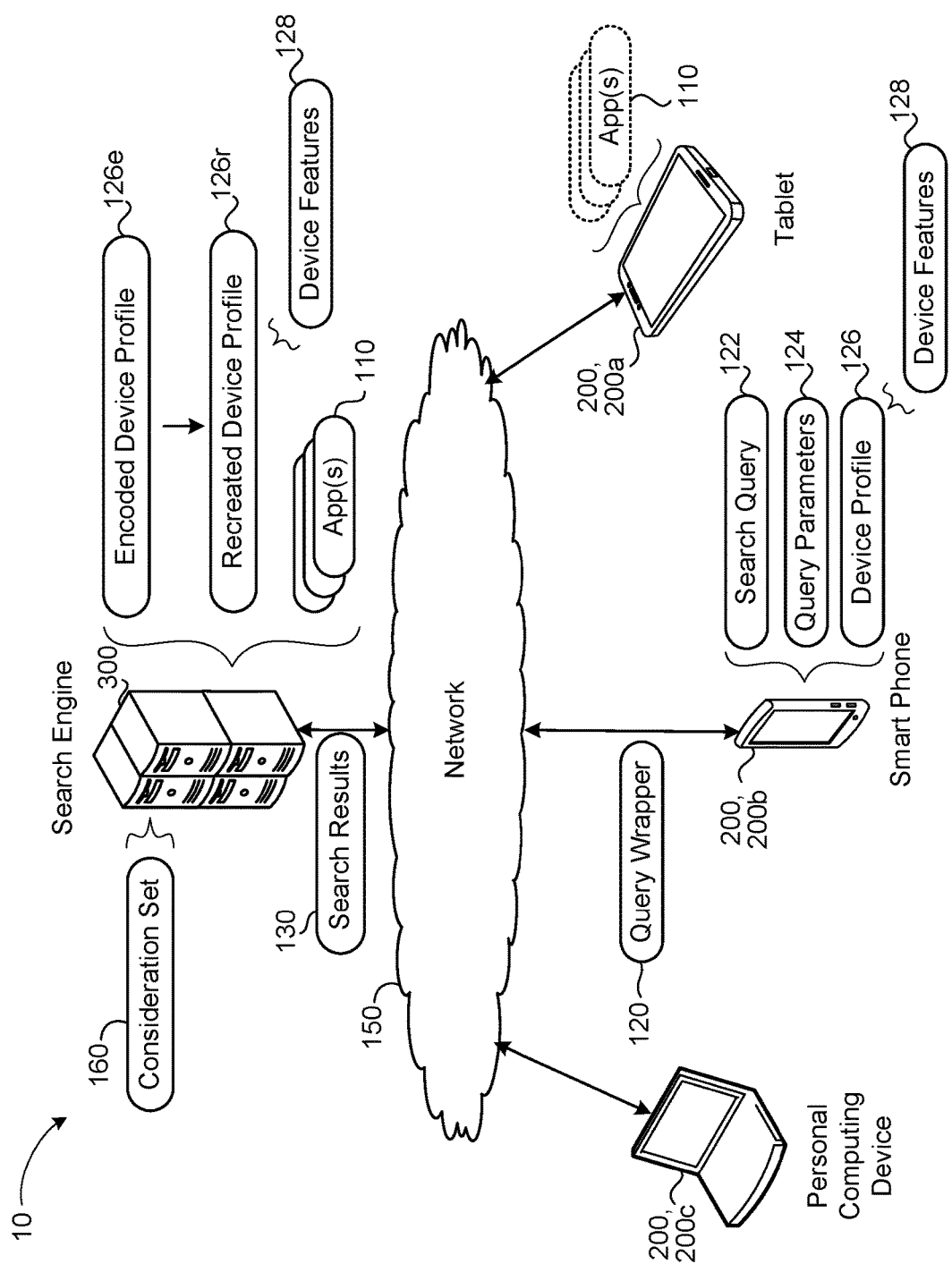
FIG. 1A is a schematic illustrating an example environment of a search engine.

FIG. 1A illustrates an example environment 10 for processing search queries 122. The example environment 10 includes a search engine 300 and one or more user devices 200. The search engine 300 is a system of one or more computing devices (e.g., server devices). The search engine 300 is configured to receive a search query 122 and a device profile 126 from a user device 200 and to provide personalized search results 130 to the user device 200 based on the search query 122 and a device profile 126. Search results 130 can include one or more result objects that the search engine 300 outputs to the user device 200, whereby the user device 200 displays the search results 130. The result objects may contain information pertaining to an item that is relevant to the search query 122. Examples of search results 130 may include, but are not limited to, listings of websites, applications, products, and/or services. A search engine 300 determines the search results 130 by identifying items that are relevant to the information conveyed in the search query 122 (and in some cases one or more other query parameters 124).

The search engine 300 utilizes the device profile 126 (and possibly other information, such as user information) to tailor the search results 130 to the user device 200 that provides the search query 122. In some implementations, the search engine 300 ranks the items or selects which items to include in the search results 130 based on the device profile 126. A device profile 126 is a data structure that defines one or more device features 128 of a user device 200. The device features can identify a list of native applications 218 (FIG. 2A) that are installed on the user device 200, a list of native applications 218 that were recently executed by the user device 200, a list of web applications 216 (FIG. 2A) that were recently accessed by the user device 200 (e.g., executed by the web browser of the user device 200), and/or a list of applications that were deleted from the user device 200. The device profile 126 can further include additional features, such as an operating system of the user device 200, a maker of the user device 200, a model of the user device 200, and/or a list of peripheral devices (e.g., camera, fingerprint scanner, etc.) of the user device 200.

The search engine 300 can be configured to perform application searches. Application searches are searches that relate to applications 110. An application 110 can refer to computer readable instructions that cause a computing device (e.g., a user device 200) to perform a task. In some examples, an application 110 may be referred to as an "app." Example applications 110 include, but are not limited to, produce and service review applications, navigation applications, news and information applications, messaging applications, media streaming applications, social networking applications, and games. Applications 110 can be executed on a variety of different user devices 200. For example, applications can be executed on mobile computing devices, such as smart phones 200b, tablets 200a, wearable computing devices (e.g., headsets and/or watches), or vehicle infotainment devices. Applications 110 can also be executed on other types of user devices 200 having other form factors, such as laptop computers 200c, desktop computers, or other consumer electronic devices. Applications 110 can be native applications 218 or web applications 216. Native applications 218 are applications that are installed on a user device 200 and at least partially executed on the user device 200. In some examples, native applications may be installed on a user device 200 prior to the purchase of the user device 200. In other examples, a user device 200 may download a native application from a digital distribution platform such as the APP STORE® digital distribution platform developed by Apple Inc. or the GOOGLE PLAY® digital distribution platform developed by Google Inc. In these examples, the user device 200 downloads and installs the application at the request of a user. In some examples, all of a native application's functionality is performed by the user device 200 on which the application is installed. These native applications may function without communication with other computing devices (e.g., via the Internet). In other examples, a native application installed on a user device 200 may access information from a remote computing device (e.g., a server) at runtime. For example, a weather application installed on a user device 200 may access the latest weather information via a remote server and display the accessed weather information to the user through the installed weather application. Web applications 216 are applications that a user accesses using a web browser application executed by the user device 200.

Application searches can include "function based application searches" and/or "application state searches." A function based application search is a search for applications 110 that are relevant to the search query 122. In a function based application search, the result objects each indicate an application 110 that is relevant to the search query 122. Each result object can contain content relating to the application. For example, if the search query 122 contains the query terms "listen to music," the search results 130 (see e.g., FIG. 1B) can include result objects 133 that provide descriptions of various audio streaming/playback applications. In another example, if the search query 122 contains the query terms "addictive games," the search results 130 can include result objects that can include descriptions of specific popular gaming applications, highly rated gaming applications, and/or games that reviewers have described as "addictive." In some implementations, the content of a result object 133 corresponding to an application 110 can include a description of the application 110, one or more screen shots of the application 110, a rating of the application 110, one or more reviews of the application 110, and/or a link to a digital distribution platform to download the application 110.

Figure 1B:
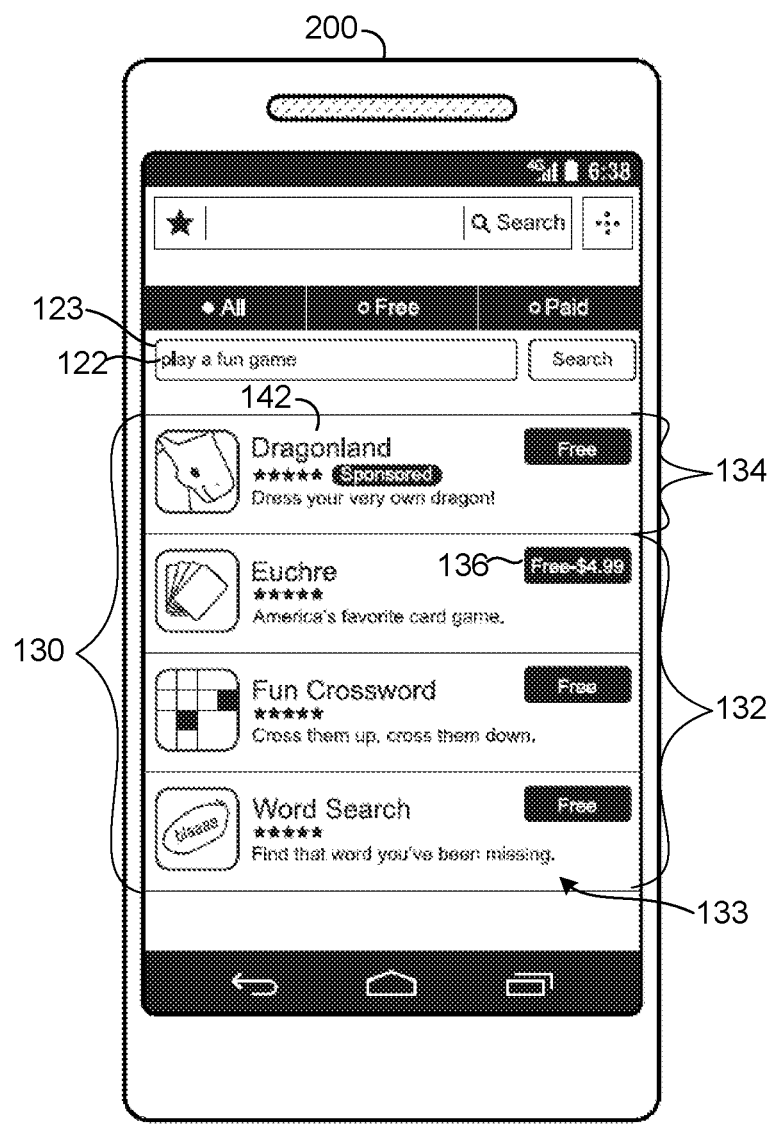
FIGS. 1B and 1C are schematics illustrating examples of search results being displayed by a user device.

FIG. 1B illustrates an example of search results 130 resulting from a function based application search. In the illustrated example, the user device 200 is displaying search results 130 corresponding to the search query "play a fun game." In the illustrated example, the search results 130 include organic search results 132 and an advertisement 134. The organic search results 132 are search results that are relevant to the search query 122. The organic search results 132 may include one or more result objects 133, each result object 133 corresponding to a different application 110. Each result object 133 may include, for example, a description of the application 110, one or more screen shots of the advertised application 110, and/or a link 136 to a digital distribution platform whereby the user can opt to download the application 110 from the digital distribution platform. Should the user desire to download the application 110, the user can select the link 136 to launch the digital distribution platform. The search results 130 illustrated in FIG. 1B are provided for example only. The search results 130 may be arranged in any suitable manner.

Additionally or alternatively, the application search engine 300 can perform application state searches. An application state search identifies specific states of applications 110 that are relevant to the search query 122. The result objects resulting from an application state search can include state links to different states of one or more applications 110. A state of an application 110 can refer to a specific screen or functionality of the application 110. For example, in response to a search query 122 containing the query terms "late-night food," an application state search can include a state link to an entry for a review of a local diner provided by a restaurant reviewing application (e.g., the YELP® application by Yelp, Inc.). In this example, the user can select the state link to the entry for the review, and the user device 200 can launch the application 110 to a state that contains the review.

A state link can refer to an object that includes text and/or images that a user may select (e.g., touch) via a user interface of the user device 200. In some implementations, the state link includes an application access mechanism. An application access mechanism allows a user device 200 to access a state of an application. An application access mechanism can include one or more application resource identifiers, one or more web resource identifiers (e.g., Uniform Resource Locators "URLs"), and/or one or more commands for accessing the state of the application. An application resource identifier is a string of letters, numbers, and/or symbols that references a specific state of a native application. An application resource identifier can include a reference to the native application 218, as well as a portion that the native application 218 can use to launch to the specified state. Some native applications may not be configured to receive application resource identifiers. In such a case, the one or more commands can be executed by the user device 200 to access a specific state of the application 110. For example, the one or more commands may be embodied in a script, that when executed cause the user device to launch a native application indicated in the script and to input one or more parameters to the native application to access the specific state. A user can select a state link (e.g., click or press the link) to launch the application 110 to the specified state. For example, a state link to a music streaming application can include a resource identifier that identifies a particular playlist or song in a manner understood by the media streaming application. When the user selects the state link to the music streaming application, the user device 200 can attempt to launch a native version of the music streaming application using an application resource identifier contained in the state link. When launched using the application URL, the music streaming application can begin playing back the selected playlist or song.

Figure 1C:
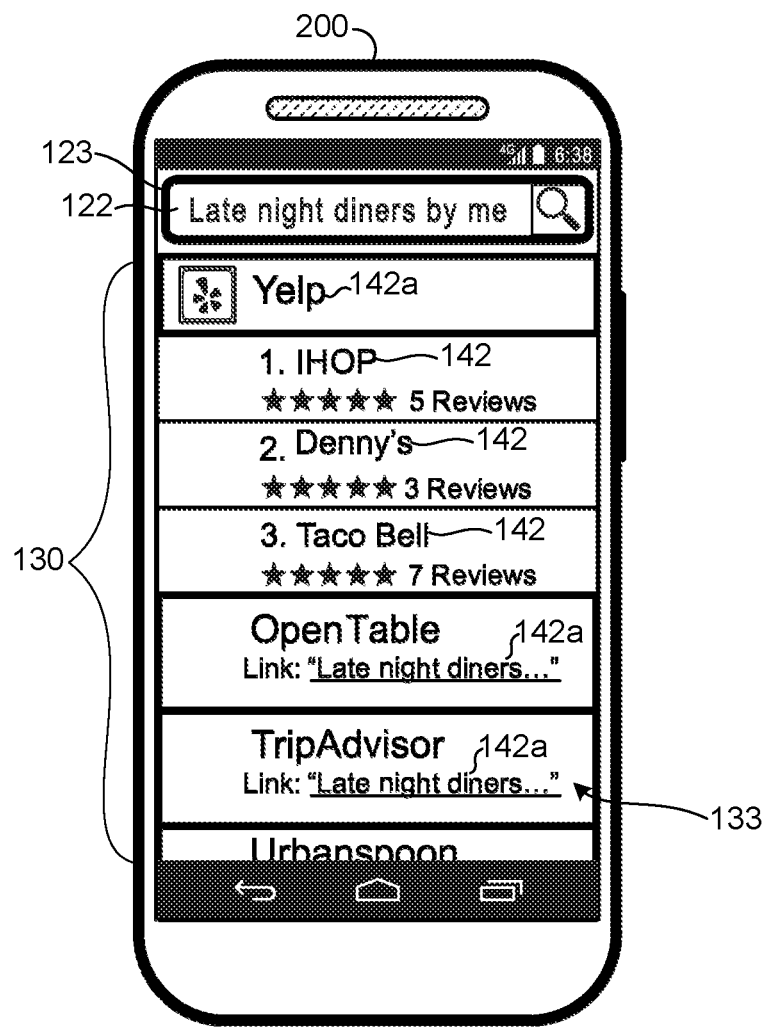

FIG. 1C illustrates an example of search results 130 resulting from an application state search. In the illustrated example, the user device 200 is displaying search results 130 corresponding to the search query "Late night diners by me." In the illustrated example, the search results 130 include state links 142 to different applications. Each state link 142 can be displayed in a result object 133. Furthermore, some of the result objects 133 may link to a default state (e.g., home page) of an application 110. For example, state link 142a links to the default page of the YELP® application. The user can select one of the state links 142 to launch the corresponding native application to the given state. In some implementations, if the native application 218 is not installed on the user device 200, the user device 200 can attempt to launch a web application 216 using a web resource identifier contained in the state link or can launch a digital distribution platform where the user can download the native application. The search results 130 illustrated in FIG. 1C are provided for example only. The search results 130 may be arranged in any suitable manner.

During an application search, the search engine 300 tailors the search results 130 based on the device features contained in the device profile 126. For instance, if the search engine 300 is performing a function based application search, the search engine 300 can adjust the search results 130 such that applications that are not installed on the user device 200 are ranked higher than applications that are installed on the user device 200 in the search results 130. In another example, if the search engine 300 is performing an application state search, the search engine 300 can adjust the search results 130 so that states of applications that are installed on the user device 200 are ranked higher than states of applications that are not installed on the user device 200. In yet another example, when performing any application search, the search engine 300 can adjust the search results 130 so that applications that have been deleted from the user device 200 do not appear in the search results or are ranked less than applications that are installed on the user device 200 and/or applications that have never been installed on the user device 200.

The user device 200 can communicate the device profile 126 to the search engine 300 at any suitable time. In some implementations, the user device 200 communicates the device profile 126 upon initiating a search session. A search session is a period during which the user device 200 sends search queries 122 to the search engine 300. Upon initiating a search session, the search engine 300 can assign a session identifier ("session ID") to the search session. The user device 200 can provide the device profile 126 to the search engine 300 and the search engine 300 can associate the session ID with the device profile 126. The search engine 300 may associate other information to the session ID as well. For instance, the search engine 300 can associate a user profile to the session ID. In some implementations, the user device 200 communicates a search query 122 in a query wrapper 120. A query wrapper 120 is a data structure that contains the search query 122 and other query parameters 124 (e.g., a location of the user device 200, an operating system of the user device 200, a user account of the user). In some implementations, the other query parameters 124 include the session ID. According to these implementations, when the user device 200 transmits query wrappers 120 during the search session the search engine 300 can look up device profile 126 using the session ID, so long as the search session corresponding to the session ID is still valid. In these implementations, the privacy of the user may be protected, as information regarding a user's device is associated with a session ID rather than the user. In some implementations, the user device 200 communicates the device profile 126 with the search query 122 in the query wrapper 120. In these implementations, the device profile 126 does not need to be transmitted at the initiation of a search session. Further, in these implementations, the privacy of the user may be protected, as information regarding the user's device 200 encoded in the Bloom filter is transmitted directly with the search wrapper 120 in a compact format and so secondary storage is not necessary. In some implementations, the search engine 300 stores the device profile 126 with a user profile of the user. In these implementations, the search engine 300 can store the device profile 126 and the user device 200 can periodically update the data contained in the device profile 126.

In some implementations, the user device 200 encodes the device profile 126 into an encoded device profile 126e to reduce the amount of data being communicated to the search engine 300. The user device 200 can compress the device profile 126 using one or more Bloom filters. A Bloom filter is a space-efficient probabilistic data structure that can be used to determine whether an element is a member of a set. In some implementations, a Bloom filter is an array of m bits that stores Boolean values (e.g., one or zero). The search engine 300 can query the encoded device profile 126e to obtain the device features 128. For example, the search engine 300 can query the Bloom filter to identify the information contained therein with a high degree of certainty. Alternatively, the user device 200 can compress the device profile 126 into a suitable format. For example, the user device 200 can compress the device profile 126 using a compression algorithm such as Deflate or BZip2.

Figure 2A:
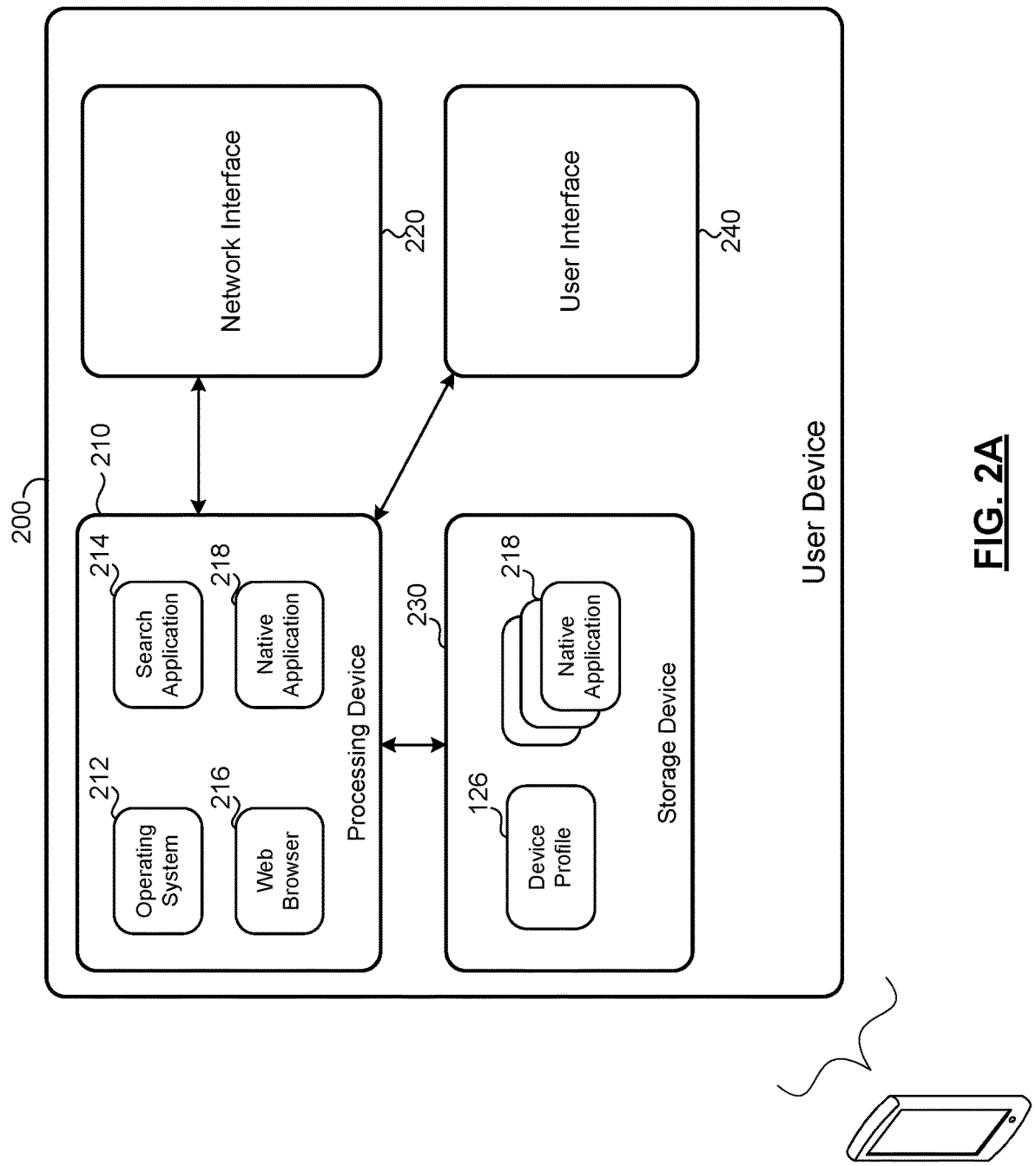
FIG. 2A is a schematic illustrating example components of a user device.

FIG. 2A illustrates example components of a user device 200. The user device 200 can include a processing device 210, a network interface 220, a storage device 230, and a user interface 240. The user device 200 can include additional components not depicted in FIG. 2 (e.g., accelerometer, sensors, GPS module).

The processing device 210 includes memory (e.g., RAM and/or ROM) that stores computer readable instructions and one or more processors that execute the computer readable instructions. In implementations where the processing device 210 includes more than one processor, the processors can execute in a distributed or individual manner. The processing device can execute an operating system 212, a search application 214, a web browser application 216, and one or more other native applications 218. The operating system 212 acts as an interface between higher level applications 214, 216, 218 and the processing device 210.

The network interface 220 includes one or more devices that are configured to communicate with the network 150. The network interface 220 can include one or more transceivers for performing wired or wireless communication. Examples of the network interface 220 can include, but are not limited to, a transceiver configured to perform cellular communications (e.g., transmission using the third generation (3G) or fourth generation (4G) telecommunications standards), a transceiver configured to perform communications using the IEEE 802.11 wireless standard, an Ethernet port, a wireless transmitter, and a universal serial bus (USB) port.

The storage device 230 can include one or more computer readable mediums that store data. The storage device 230 can store some or all of the computer readable instructions that define the search application 214, the web browser application 216, and the one or more other native applications 218. The storage device 230 can store other data as well (e.g., media contents, application data, contacts, documents).

The user interface 240 can include one or more devices that allow a user to interact with the user device 200. The user interface 240 can include one or more of, for example, a touchscreen, a QWERTY keyboard, a display device, speakers, a touchpad, and a microphone. The user interface 240 receives input from the user and provides the input to the processing device 210. The user interface 240 receives output from the processing device 210 and presents (e.g., displays) the output to the user.

The web browser application 216 is an application 110 that requests web data from a web browser and displays the data on the user interface device 240. The web browser application 216 can be used to access web applications. A web application 216 may be identified by a web resource identifier (e.g., a URL). In some implementations, the web browser application 216 can access a specific state of a web application by accessing a web server located in the domain portion of a web resource identifier and providing a request to the web server using the state parameters indicated in the path portion of the web resource identifier.

The native applications 218 are applications 110 that are executed, in part, by the processing device 210. Native applications 218 can be developed by third parties and made available to consumers in a variety of manners. For instance, a user can download a native application to the user device 200 from a digital distribution platform or from a website associated with the third party. Additionally or alternatively, the user can load a native application into the storage device 230 of the user device 200 from a removable media, such as a CD-ROM. Native applications 218 can provide any suitable functionality.

The search application 214 receives a search query 122 from a user via the user interface 240 and transmits the search query 122 to the search engine 300. The search application 214 is also configured to determine a device profile 126 of the user device 200, which the search application 214 also transmits to the search engine 300. The search engine 300 returns the search results 130 to the search application 214. The search application 214 displays the search results 130 (e.g., as shown in FIGS. 1B and 1C). In the illustrated example, the search application 214 is shown as a native application. Alternatively, the search application 214 can be a web application 216 that is executed via the web browser 216.

In some implementations, the search application 214 initiates a search session with the search engine 300. In some of these implementations, the search application 214 can transmit a request to the search engine 300 to initiate the search session. The search engine 300 can initiate a search session and can communicate information regarding the search session to the search application 214. The information regarding the search session can include the session ID. In some implementations, the search application 214 communicates the device profile 126 to the search engine 300 during the initiation of the search session or after the search engine 300 has initiated the search session.

The search application 214 generates the device profile 126 indicating one or more device features. As previously mentioned, the device features included in the device profile 126 can include a list of native applications 218 currently installed on the user device 200, a list of native applications 218 recently used on the user device, and/or a list of native applications 218 that have been deleted from the user device 200. Each native application 218 indicated in the lists of native applications 218 can be represented by an application identifier ("application IDs"). An application ID 266 may be, for example, any suitable numeric or alphanumeric string. The application ID 266 may be assigned to the application by, for example, the digital distribution platform that offers the application or the search engine 300. In some implementations, the application ID 266 can be the name of the application 110, 218.

The search application 214 can obtain the list(s) of native applications 218 from the operating system. Additionally or alternatively, the search application 214 can monitor the installation, use, and/or deletion of native applications on the user device 200 to determine the list(s) of native applications 218. In some implementations, the search application 214 monitors the web browser application 216 to determine web applications 216 that were recently accessed using the web browser application 216. For each identified native application, the search application 214 determines the application ID of the native application and adds the application ID to the list of native applications 218.

In some implementations, the search application 214 can encode the lists into an encoded device profile 126e. According to some implementations, the encoded device profile 126e is a Bloom filter. The search application 214 can provide the encoded device profile 126e to the search engine 300 during initiation of the search session. Alternatively, the search application 214 can provide the encoded device profile 126e at query time (i.e., with each search query 122 transmitted to the search engine 300).

Figure 2B:
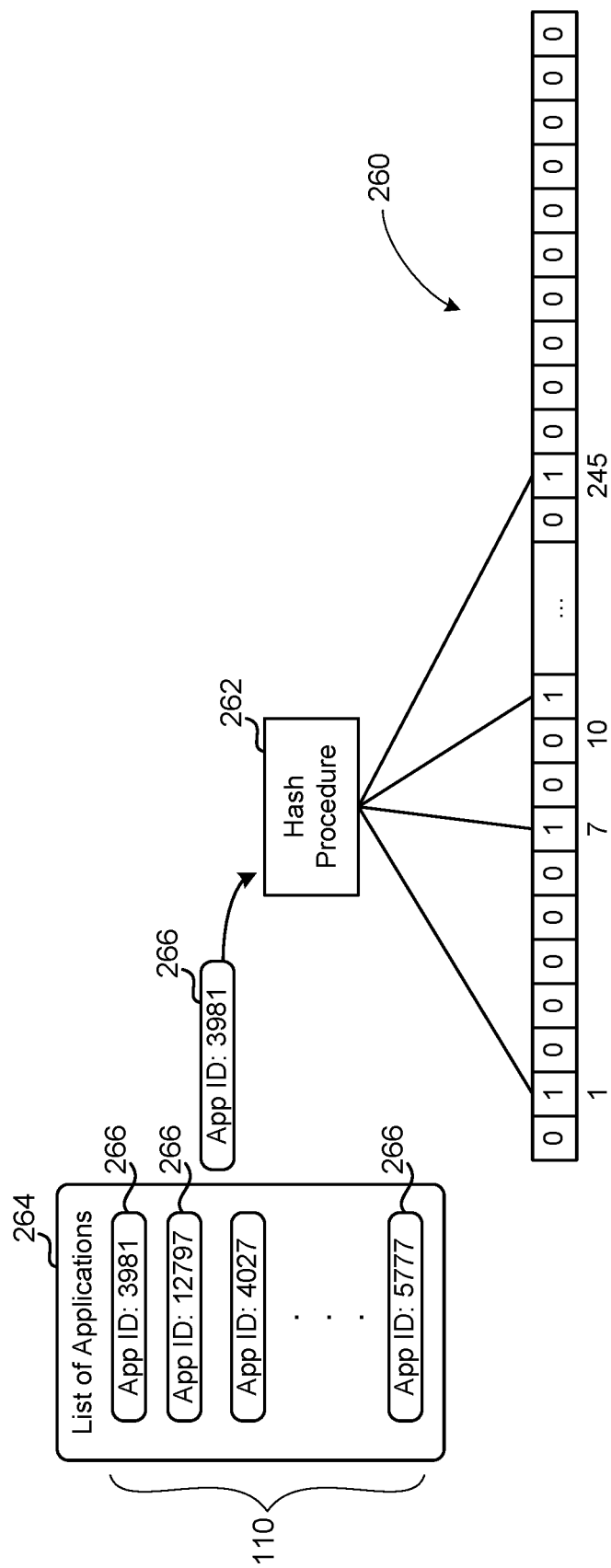
FIG. 2B is a schematic illustrating an example of generating a Bloom filter using a list of applications.

FIG. 2B illustrates an example of the search application 214 adding information (e.g., a list of applications) to a Bloom filter 260. As previously mentioned, the Bloom filter 260 an array of m bits that stores Boolean values (e.g., one or zero). The search application 214 employs a hash procedure 262 to add information to the Bloom filter 260. The hash procedure 262 receives a value corresponding to an instance of the information (e.g., an application identifier from a list of applications) and generates k (e.g., four or five) hash values between 0 and m−1. Each of the k hash values output by the hash procedure 262 corresponds to a different index address (i.e. element) of the Bloom filter 260. For each of the k hash values output by the hash procedure 262, the search application 214 sets the element at the index address indicated by the hash value equal to one. In this way, the search application 214 has added the instance of the information to the Bloom filter 260. In some scenarios, the search application 214 may have previously set one or more of the elements of the Bloom filter 260 to one (i.e., from one or more previous instances of information that the search application 214 added to the Bloom filter 260). In these scenarios, the search application 214 keeps the values equal to one. The search application 214 can iteratively perform the above procedure to add each instance of the information to the Bloom filter 260. In some implementations, the search application can 214 convert the Bloom filter 260 to a string of ASCII characters (e.g., a base 91 string of characters), such that the search application 214 can communicate the string to the search engine 300.

In operation, the search application 214 receives a list 264 of applications 110 (e.g., a list of native applications 218 installed on the user device 200) and generates a Bloom filter 260 based on the list 264 of applications 110. Each application 110 indicated in the list 264 of applications 110 may be represented by a unique application identifier 266 (an "application ID"). For each application ID 266 in the list 264 of applications 110, the search application 214 adds the application ID 266 to the Bloom filter 260 using the hash procedure 262. In the example of FIG. 2B, the search application 214 is adding an application ID 266 of 3981 to the Bloom filter 260. The search application 214 feeds the application ID 266 (e.g., 3981) to the hash procedure 262 and the hash procedure outputs four hash values (e.g., 1, 7, 10, and 245). The search application 214 sets the elements of the Bloom filter 260 at index addresses 1, 7, 10, and 245 equal to 1. The search application 214 can feed each application ID 266 to the hash procedure 262 and can update the Bloom filter 260 based on the outputs of the hash procedure 262.

The hash procedure 262 may include up to k different hash functions that produce k different hash values. Alternatively, the hash procedure 262 can include a single hash function that takes an additional argument i. In the latter scenario, the value of i is given k unique values to output k different hash values. In some implementations, the hash procedure utilizes a pair of hash functions (e.g., H1(x) and H2(x) and a combination function that takes the inter argument i. The result of the combination $C(H1(x), H2(x), i)$ is the effective calculation of the hash function $K_i(x)$ without re-calculation of either H1(x) or H2(x). The hash procedure can utilize any suitable hash function or functions. In some implementations, the hash procedure can utilize non-cryptographic hash functions, such as the MurmurHash. The hash procedure 262 can modulo the k outputs of the hash function or functions by m (i.e., the number of elements in the Bloom filter 260) to obtain the k index addresses of the Bloom filter 260. In some implementations, search application 214 can perform the above procedure for the different lists of applications 110. For example, the search application 214 can perform the above procedure for the list of native applications 218 installed on the user device 200, the list of native applications 218 recently executed by the user device 200, a list of web applications 216 recently accessed by the user device 200, and/or the list of native applications 218 deleted from the user device 200. In these implementations, the search application 214 can generate a separate Bloom filter 260 for each list. In some of the some implementations, the separate Bloom filters 260 can be combined into a single partitioned Bloom filter, whereby each partition of the Bloom filter 260 corresponds to a different list of applications 110 (e.g., a first partition corresponding to a list of installed native applications, a second partition corresponding to a list of recently executed and/or accessed applications, and a third partition corresponding to a list of deleted applications). Alternatively, the search application 214 can combine a plurality of lists into a single list 264 that is encoded into the Bloom filter 260. In these implementations, the search application 214 can add one or more characters to the application ID 266 to indicate which list 264 the item belongs. In some of these implementations, the search application 214 can add an unrecognized character (i.e., a character that is not used in application IDs, such as "%" or "$") followed by an indicator of the list 264 to which the item belongs. For instance, if an application 110 having the ID 12345 is installed on the user device 200 and has been recently executed on the user device 200, the search application 214 may create two items to include in the Bloom filter 260. The two items may be, for example, 12345$I and 12345$R, thereby indicating that the application 110 is installed on the device 200 and recently executed on the device 200. In this way, the hash procedure 262 outputs k index addresses for the value 12345$I and k index addresses for the value 12345$R, such that a single Bloom filter 260 can indicate that the application having the application ID 12345 is installed on and recently executed by the user device 200. The search application 214 can add the indicators to the application IDs 266 in any other suitable manner. For example, the search application 214 can add the indicator followed by the unrecognized character to the beginning of the application IDs 266 (e.g., I$12345).

The values of m and k (the Bloom filter 260 parameters) can be selected to reduce the length of the bloom filter 260 and/or reduce the probability of false positives. The greater the value of m, the less likely it is to have a false positive at the cost of a longer Bloom filter 260. In some implementations, the width of the Bloom filter 260, m, and the number of outputs of the hash procedure 262 (e.g., the number of hash functions in the hash procedure 262), k, can be determined according to equations (1) and (2), provided as follows:

$$m = \text{ceiling}(-n^* \ln(p)/\ln(2)^2) \quad (1)$$

$$k = \text{floor}(m/n^* \ln(2)) \quad (2)$$

where n is the total number of items that could be added to the Bloom filter 260 (e.g., the number of known applications) and p is a given probability of a false positive (e.g., a maximum allowable false positive rate). For example, in a scenario where n=100 total elements to can be added to the Bloom filter 260 (e.g., application IDs to be added to the Bloom filter 260) and a 99% confidence rate of the Bloom filter 260 is desired (i.e., a one percent (1%) false positive probability), the Bloom filter 260 can be encoded with m=959 bits and k=7 hash procedure such that the Bloom filter 260 size is approximately ten (10) bits per element to be added thereto. It is noted that adding elements to the Bloom filter 260 does not per se increase the size of the Bloom filter 260; rather, the Bloom filter 260 can be sized for the given capacity (n) to maintain the specified probability. When representing the resulting Bloom filter 260 as, for example, a string encoded in base 91 for ease of transmission in an HTTP request, the byte size of the filter represented in an ASCII string becomes ceiling(959*(256/91)/8/0.86)=138 bytes. For 99.9% confidence (0.1% false positive) and 100 entries, m=1438 bits, k=10 hash procedure outputs, and a base 91 string length is 207 bytes. These sizes are well within the capacity of a small HTTP GET request. Without change in functionality, further reductions in size of the Bloom filter 260 may be accomplished by using more space-efficient choices of Bloom filters 260, such as Blocked Bloom filters or Golomb-Compressed Sequences, since all the elements in the set are known at once.

In some implementations, the Bloom filter parameters (m and k) are determined off-line based on the expected value of n (e.g., the expected maximum number of application IDs in the list or lists of applications), the desired false positive rate, and equations (1) and (2). In these implementations, the Bloom filter parameters are fixed and may be hard-coded in the search application 214. In other implementations, the search application 214 calculates the Bloom filter parameters based on the device features of the user device 200, the desired false positive rate, and equations (1) and (2). In these implementations, the search application 214 can determine the Bloom filter parameters prior to generating the Bloom filter 260 and after determining the list or lists of applications. The number of application IDs 266 in the list or lists can be used to determine n. Further, in these implementations, the search application 214 can provide the values of m and/or k with the Bloom filter 260, so that the search engine 300 can recreate the device profile of the user device.

While the search application 214 is described as encoding at least a portion of the device profile 126 into a Bloom filter 260, the search application 214 can utilize suitable compression techniques to compress the device profile 126. For example, the search application 214 can compress the device profiles 126 using known compression techniques (e.g., Deflate, BZIP2, or LZMA). The search application 214 can provide the compressed device profile 126 to the search engine 300. For example, the search application 214 can provide the compressed device profile at predetermined times (e.g., once a week), at query time, or at the initiation of a search session.

The search application 214 is further configured to present a graphical user interface ("GUI") that allows a user to enter a search query 122 and displays search results 130. In some implementations, the GUI can display a search bar 123 (FIGS. 1B and 1C) whereby the user can provide text and/or speech input into the search bar 123. Additionally, or alternatively, the operating system 212 of the user device 200 can display the search bar 123 on the home screen of the user device 200, whereby a user can enter the search query 122 directly from the home screen. In these implementations, when the user enters the search query 122 into the search bar displayed on the home screen and executes the search, the operating system 212 of the user device 200 can launch the search application 214, which generates a query wrapper 120 containing the search query 122 and zero or more other query parameters 124. The search application 214 can obtain the other query parameters 124 in any suitable manner. For example, the search application 214 can obtain information regarding the device 200 (e.g., device type, operating system type, operating system version) from a file in the storage device 230 or in the memory of the processing device 210. Additionally or alternatively, the search application 214 can obtain information regarding the device from a sensor or component of the user device 200 (e.g., the geo-location can be obtained from a GPS module of the user device 200). The search application 214 can create a query wrapper 120 based on the provided search query 122 and the obtained query parameters 124.

The search application 214 transmits the query wrapper 120 to the search engine 300, which responds with the search results 130. The search application 214 displays the search results 130 in the graphical user interface (GUI) 240 of the search application 214 (e.g., FIGS. 1B and 1C). As previously discussed, the search application 214 can display state links 142 to access resources that are relevant to the query parameters. The state links 142 can include application resource identifiers that can be used to launch a third party application and access a specific state within the third party application. When the user selects a state link 142, the search application 214 can initiate the accessing of the third party application at the specific state. In some implementations, the search application 214 attempts to launch a native application 218 version of a third party application. To initiate launching the native application 218 to the specific state, the search application 214 provides an instruction to launch the third party application to the operating system 212 using the information provided in the state link. The operating system 212 can attempt to launch a native application 218 indicated by an application resource identifier 365b in the state link, and if unsuccessful, can attempt to access the third party application via the web browser application 216 (i.e., leverage the web application version of the third party application).

Figure 3:
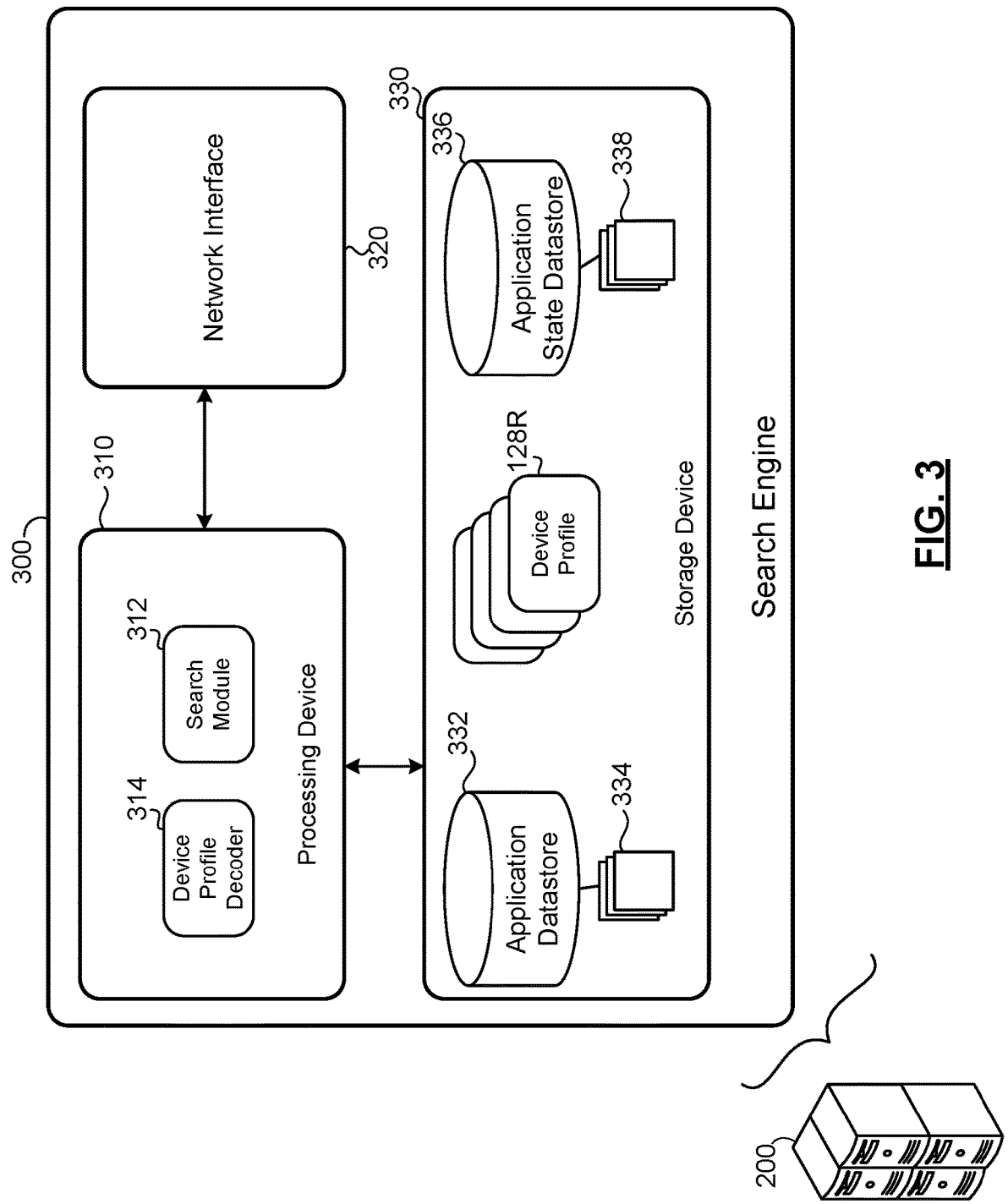
FIG. 3 is a schematic illustrating example components of a search engine.

FIG. 3 illustrates an example of the search engine 300. The search engine 300 is configured to receive search queries 122 and device profiles 126 from user devices 200 and to perform application searches (e.g., function based application searches or application state searches) based on the search queries 122 and device profiles 126. The search engine 300 can include a processing device 310, a network interface device 320, and a storage device 330.

The processing device 310 can include memory (e.g., RAM and/or ROM) that stores computer readable instructions and one or more physical processors that execute the computer readable instructions. In implementations where the processing device 310 includes more than one processor, the processors can operate in an individual or distributed manner. Furthermore, in these implementations the two or more processors can be in the same computing device or can be implemented in separate computing devices (e.g., rack-mounted servers). The processing device 310 can execute a search module 312 and a device profile decoder 314. The processing device 310 can execute additional components not shown.

The network interface device 320 includes one or more devices that can perform wired or wireless (e.g., WiFi or cellular) communication. Examples of the network interface device 320 include, but are not limited to, a transceiver configured to perform communications using the IEEE 802.11 wireless standard, an Ethernet port, a wireless transmitter, and a universal serial bus (USB) port.

The storage device 330 can include one or more computer readable storage mediums (e.g., hard disk drives and/or flash memory drives). The storage mediums can be located at the same physical location or at different physical locations (e.g., different servers and/or different data centers). The storage device 230 can store one or more of an application datastore 332, an application state datastore 336, and device profiles 126 of one or more user devices 200.

The search module 312 receives a search query 122 and generates the search results 130 based thereon. The search module 312 can perform any suitable type of search to identify the search results 130. For example, the search module 312 can perform function based application searches and/or application state searches.

In some implementations, the search module 312 can initiate a search session. The search module 312 receives a request from a user device 200 to initiate a search session. The search module 312 can open a new search session and assign a session ID to the new search session. The search module 312 can respond to the user device 200 with the session ID. In these implementations, the user device 200 can provide the session ID in subsequent query wrappers 120 for the duration of the search session. In some implementations, the user device 200 can provide the device profile 126 of the user device 200 during or upon initiation of the search session. In these implementations, the search module 312 associates the session ID to the device profile 126 so that the search module 312 can look up the device profile 126 when it receives subsequent query wrappers 120 containing the session ID.

In implementations where the device profile 126 is encoded in a Bloom filter 260, the device profile decoder 314 queries the encoded device profile 126e to obtain the device features 128 of a user device 200. The device profile decoder 314 can receive the encoded device profile 126e at the initiation of a search session. Alternatively, the device profile decoder 314 can receive the encoded device profile 126e at query time (e.g., the user device 200 transmits the encoded device profile 126e with each search query 122).

The device profile decoder 314 queries the encoded device profile 126 according to the manner by which the device profile 126 was encoded. As previously discussed and according to some implementations, an encoded device profile 126e can include one or more Bloom filters 260, whereby the one or more Bloom filters 260 represent a one or more list of applications (e.g., application IDs 266 of applications 110 installed on a user device 200, application IDs 266 of applications 110 recently executed by the user device 200, application IDs 266 of web applications 216 recently accessed by the user device 200, or application IDs 266 of applications 110 deleted from the user device 200). The device profile decoder 314 queries the Bloom filters 260 (or partitions of the Bloom filter 260) to obtain the different lists of applications 110.

In implementations where the encoded device profile 126 includes a Bloom filter 260, the device profile decoder 314 utilizes a hashing procedure 262 that is identical or substantially identical (that is, outputs the same values in response to identical input) to the hashing procedure 262 executed by the search application 214 to determine the likely contents of the device profile 126. Initially, the device profile decoder 314 obtains a list of potential applications 110. The list of potential applications 110 can be the consideration set 160 of applications determined by the search module 312 (discussed below) or can be the entire collection of applications that have application records 334 stored in the application datastore 332. Each of the potential applications 110 has a corresponding application ID 266. The device profile decoder 314 retrieves an application ID 266 of an application 110 of a set of potential applications 110 and feeds the application ID 266 to the hashing procedure 262. The output of the hashing procedure 262 is k values, each value representing a different index address. Thus, the device profile decoder 314 inputs an application ID 266 into the hashing procedure 262, which outputs k index addresses. Alternatively, the device profile decoder 314 can utilize a lookup table that stores pre-calculated results of the hashing procedure 262. The lookup table can provide the results of the hashing procedure 262 for the application IDs 266 of each possible application 110 represented in the application datastore 332 (e.g., via application records 334). In some of these implementations, the lookup table can associate application IDs 266 or application names to the k index addresses.

The device profile decoder 314 checks the values of the elements of the Bloom filter 260 at each of the k index addresses, and if the values of the elements of each of the k indexes addresses are equal to one, then the device profile decoder 314 determines that the retrieved application ID likely belongs to a list of application IDs 266. For example, drawing from the example given with respect to FIG. 2B, the device profile decoder 314 may retrieve an application ID 266 of 3981 and may feed the application ID 266 into the hashing procedure 262. The hash procedure 262 outputs the values 1, 7, 10, and 245. The device profile decoder 314 then checks the values of the Bloom filter 260 at the index addresses 1, 7, 10, and 245. If each of the values are equal to one, the device profile decoder 314 determines that it is likely that the user device 200 included the application 110 corresponding to the application ID 266 of 3981 in a list of applications 110 (with a Bloom filter 260, there does exist a possibility of false positives but not of false negatives). If any of the elements at one or more of the index addresses are equal to zero, the device profile decoder 314 determines that the application corresponding to the application ID 266 does not belong in the list of applications 110. The device profile decoder 314 repeats this process for each application in the set of potential applications 110 to obtain a list of application IDs 266 (e.g., application IDs 266 of native applications 218 that are likely on the user device 200, native applications 218 that are likely recently executed by the user device 200, web applications 216 that were likely recently accessed by the user device 200, or native applications 218 that were likely deleted from the user device 200). If the compressed device profile 126 includes more than one Bloom filter 260, this process is repeated for each Bloom filter 260.

In implementations where the user device 200 (e.g., search application 212) adds characters to an application ID 266 to indicate which list or lists the application 110 belongs to, the device profile decoder 314 can recreate the application IDs 266 of the potential applications 110 in the same manner. Drawing from the example provided above, if the potential applications include the application having the application ID 12345, the device profile decoder 314 can query the Bloom filter 260 using the following application IDS: 12345$I (installed on the user device 200), 12345$R (recently executed by the user device 200), and 12345$D (deleted from the user device 200). In this way, the device decoder 314 can determine whether the application is installed, recently executed, and/or deleted from the user device 200 using a single Bloom filter 260.

In some implementations, the device profile decoder 314 can recreate a device profile 126r of the user device 200 based on the querying of the encoded device profile 126e. In some of these implementations, the recreated device profile 126r is a device-specific lookup table indicating the device features 128 of the user device 200. For example, the device profile decoder 314 can create a device-specific lookup table that indicates a list of native applications that are installed on the user device 200, a list of native applications 218 recently executed by the user device 200, list of web applications 216 recently accessed by the user device 200, and/or a list of applications 110 that were deleted from the user device 200. The recreated device profile 128R can be associated with the session ID of a search session and/or can be associated with a user profile that the user device 200 is associated with.

In implementations where the device profile 126 is compressed, the device profile decoder 314 can decompress the device profile 126 to obtain the device features. In these implementations, the device profile decoder 314 can utilize known decompression techniques to decompress the device profile 126. The device profile decoder 314 can generate a recreated device profile 126r based on the results of the decompression (e.g., a device-specific lookup table). The recreated device profile 126r table can be associated with the session ID of a search session and/or can be associated with a user profile that the user device 200 is associated with.

In implementations where the device profile 126 is received at the beginning of a search session, the device profile decoder 314 can cache the recreated device profile 126r (e.g., the user specific lookup table) in the storage device 230. In these implementations, the search module 312 can assign the session ID to the recreated device profile 128R of the user device 200 that requested the search session, such that when the search module 312 receives a subsequent query wrapper 120 containing the session ID, the search module 312 can retrieve the recreated device profile 126r of the user device 200. Alternatively, an encoded device profile 126e can be cached and can be queried each time a new search query 122 is received and processed. In other implementations, the encoded device profile 126 is received with a search query 122 and the device profile decoder 314 queries the encoded device profile 126e while the search engine 300 processes the search query 122.

The search module 312 receives a query wrapper 120 containing the search query 122 and one or more query parameters 124 from a user device 200. The search module 312 identifies the search results 130 based on the search query 122 and/or the one or more query parameters 124. The search module 312 utilizes a recreated device profile 126r corresponding to the user device 200 tailor the search results 130 to the user device 200. In some implementations, the recreated device profile 126r is used to rank the items included in the search results 130. Additionally or alternatively, the search module 312 may utilize the recreated device profile 126r to include/exclude items in/from the search results 130.

In implementations where the search module 312 performs function based application searches, the search module 312 can utilize the application data store 332 to perform the search. The application datastore 332 may include one or more databases, indices (e.g., inverted indices), files, or other data structures storing this data. The application datastore 332 includes application data of different applications 110. The application data of an application 110 may include keywords associated with the application 110, reviews associated with the application 110, the name of the developer of the application 110, the platform of the application 110, the price of the application 110, application statistics (e.g., a number of downloads of the application and/or a number of ratings of the application), a category of the application 110, and other information. The application datastore 332 may include metadata for a variety of different applications 110 available on a variety of different operating systems.

In some implementations, the application datastore 332 stores the application data in application records 334. Each application record 334 can correspond to an application 110 and may include the application data pertaining to the application 110. An example application record 334 includes an application name, an application ID 266, and other application features. The application record 334 may generally represent the application data stored in the application datastore 332 that is related to an application 110.

The application name may be the trade name of the application represented by the data in the application record 334. The application ID 266 identifies the application record 334 (or application 110) amongst the other application records 334 (or other applications 110) included in the application datastore 332. In some implementations, the application ID 266 may uniquely identify the application record 334. In some implementations, the application ID is also used by the user device 200 to populate the device profile 126. In some implementations, the application ID 266 is a unique ID that the digital distribution platform that offers the application assigns to the application. In other implementations, the search engine 300 assigns application IDs 266 to each application 110 when creating an application record 334 for the application 110.

The application features may include any type of data that may be associated with the application 110 represented by the application record 334. The application features may include a variety of different types of metadata. For example, the application features may include structured, semi-structured, and/or unstructured data. The application features may include information that is extracted or inferred from documents retrieved from other data sources (e.g., digital distribution platforms, application developers, blogs, and reviews of applications) or that is manually generated (e.g., entered by a human).

The application features may include the name of the developer of the application 110, a category (e.g., genre) of the application 110, a description of the application 110 (e.g., a description provided by the developer), a version of the application 110, the operating system the application is configured for, and the price of the application 110. The application features further include feedback units provided to the application. Feedback units can include ratings provided by reviewers of the application 110 (e.g., four out of five stars) and/or textual reviews (e.g., "This app is great"). The application features can also include application statistics. Application statistics may refer to numerical data related to the application 110. For example, application statistics may include, but are not limited to, a number of downloads of the application 110, a download rate (e.g., downloads per month) of the application, and/or a number of feedback units (e.g., a number of ratings and/or a number of reviews) that the application has received. The application features may also include information retrieved from websites, such as comments associated with the application, articles associated with the application (e.g., wiki articles), or other information. The application features may also include digital media related to the application 110, such as images (e.g., icons associated with the application and/or screenshots of the application) or videos (e.g., a sample video of the application).

The search module 312 receives a query wrapper 120 that contains a search query 122 and in some scenarios, one or more query parameters 124. The search module 312 may perform various analysis operations on the search query 122. For example, analysis operations performed by the search module 312 may include, but are not limited to, tokenization of the search query 122, filtering of the search query 122, stemming the search query 122, synonymization of the search query 122, and stop word removal. In some implementations, the search module 312 may further generate one or more reformulated search queries based on the search query 122 and the query parameters 124. Reformulated search queries are search queries that are based on some sub-combination of the search query 122 and the query parameters 124.

In some implementations, the search module 312 identifies a consideration set 160 of applications (e.g., a list of applications) based on the search query 122 and, in some implementations, the reformulated queries. In some examples, the search module 312 may identify the consideration set 160 by identifying applications 110 that correspond to the search query 122 or the reformulated search queries based on matches between terms of the query 122 and terms in the application data of the application (e.g., in the application record 334 of the application). For example, the search module 312 may identify one or more applications represented in the application datastore 332 based on matches between tokens representing the terms of the search query 122 and words included in the application records 334 of those applications 110. The consideration set 160 may include a list of application IDs and/or a list of application names.

The search module 312 may be further configured to perform a variety of different processing operations on the consideration set 160 to obtain the search results 130. In some implementations, the search module 312 may generate a result score for each of the applications 110 included in the consideration set 160. In some examples, the search module 312 may cull the consideration set 160 based on the result scores of the applications contained therein. For example, the subset may be those applications 110 having the greatest result scores or have result scores that exceed a threshold. The information conveyed in the search results 130 may depend on how the search module 312 calculates the result scores. For example, the result scores may indicate the relevance of an application to the search query 122, the popularity of an application in the marketplace, the quality of an application, and/or other properties of the application.

The search module 312 may generate result scores of applications 110 in a variety of different ways. In general, the search module 312 may generate a result score for an application 110 based on one or more scoring features. The search module 312 may associate the scoring features with the application 110 and/or the query 122. An application scoring feature may include any data associated with an application 110. For example, application scoring features may include any of the application features included in the application record 334 or any additional parameters related to the application 110, such as data indicating the popularity of an application 110 (e.g., number of downloads) and the ratings (e.g., number of stars) associated with the application 110. A query scoring feature may include any data associated with a search query 122. For example, query scoring features may include, but are not limited to, a number of words in the search query 122, the popularity of the search query 122 (e.g., the frequency at which users provide the same search query 122), and the expected frequency of the words in the search query 122. An application-query scoring feature may include any data, which may be generated based on data associated with both the application 110 and the search query 122 (e.g., the query that resulted in the search module 312 identifying the application record 334 of the application 110). For example, application-query scoring features may include, but are not limited to, parameters that indicate how well the terms of the query match the terms of the identified application record 334. The search module 312 may generate a result score for an application based on at least one of the application scoring features, the query scoring features, and the application-query scoring features.

The search module 312 may determine a result score based on one or more of the scoring features listed herein and/or additional scoring features not explicitly listed. In some examples, the search module 312 may include one or more machine-learned models (e.g., a supervised learning model) configured to receive one or more scoring features. The one or more machine-learned models may generate result scores based on at least one of the application scoring features, the query scoring features, and the application-query scoring features. For example, the search module 312 may pair the query 122 with each application 110 and calculate a vector of features for each (query, application) pair. The vector of features may include application scoring features, query scoring features, and application-query scoring features. The search module 312 may then input the vector of features into a machine-learned regression model to calculate a result score that may be used to rank the applications 110 in the consideration set 160. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels. The foregoing is one example manner by which the search module 312 can calculate a result score. According to some implementations, the search module 312 can calculate result scores in alternate manners.

In some implementations, the search module 312 may also utilize one or more of the device features 128 of the recreated device profile 126 R to determine the result score for the application 110. For instance, whether the application 110 is already installed on the user device 200 or was deleted from the user device 200 can influence the result score (namely, the application 110 may be less relevant to the search query is it is already installed or has been deleted from the device 200). The search module 312 can feed the device features 128 from the recreated device profile 126*r* into the machine learned model(s) along with the other features of the application 110.

In other implementations, the search module 312 performs variable boosting on the result scores based on the device features 128 contained in the recreated device profile 126*r*. In these implementations, the search module 312 may implement business rules that take into account the device features 128 to determine whether to perform variable boosting. Variable boosting can include multiplying a result score of an application 110 in the consideration set by a boosting factor. A boosting factor can be a value that either increases (>1) or decreases (<1) the result score of an application 110. The values of the boosting factors can be selected in any suitable manner. In an example, one business rule may instruct the search module 312 to multiply the result score by a first boosting factor (e.g., 0.8) if the application 110 is installed on the user device 200 and by a second boosting factor (e.g., 0.5) if the application 110 has been deleted from the user device 200. Another example business rule may instruct the search module 312 to multiply the result score by a first boosting factor (e.g., 0.8) if the application 110 is installed on the user device 200 and to remove the application 110 from the consideration set 160 if the application 110 has been deleted from the user device 200. In another example, the business rule may instruct the search module 312 to multiply the result score by a boosting factor (1.5) if the application 110 is not indicated in the device profile (i.e., the application 110 has never been installed on the user device). The foregoing are examples of business rules. The search module 312 may implement any other suitable additional or alternative business rules.

The search module 312 may use the result scores in a variety of different ways. In some examples, the search module 312 may use the result scores to rank the applications 110 in the consideration set 160 and that are ultimately included in the search results 130. In these examples, a greater result score may indicate that the application 110 is more relevant to the search query 122 and/or the query parameters 124 than an application 110 having a lesser result score. Additionally or alternatively, the search module 312 can cull the consideration set 160 by removing applications 110 from the consideration set 160 that have result scores that do not exceed a minimum threshold. The search module 312 can include any remaining applications 110 of the consideration set 160 in the search results 130. In examples where the search results 130 are displayed as a list of application descriptions (e.g., an icon of an application 110 and a description of the application 110) on a user device 200, the application descriptions associated with larger result scores may be listed nearer to the top of the displayed search results 130 (e.g., near to the top of the screen). In these examples, application descriptions having lesser result scores may be located farther down the displayed search results 130 (e.g., off screen) and may be accessed by a user scrolling down the screen of the user device 200 or viewing a subsequent page of search results 130.

The search module 312 can generate result objects 133 for each application 110 indicated in the consideration set 160 (after processing). The search module 312 can generate a result object 133 based on the application records 334. The result object 133 can include a link to a digital distribution platform where the application 110 can be purchased and/or downloaded. The link can include a resource identifier (e.g., an application resource identifier and/or a web resource identifier) to a state of the digital distribution platform where the application 110 can be downloaded. The result object 133 can further include additional data. The additional data can be textual (e.g., a description of the application state) or non-textual (an icon or screen shot). The search module 312 can obtain the additional data from the application record 334 of the corresponding application 110.

In some implementations, the search module 312 performs application state searches. The search module 312 can perform an application state search in any suitable manner. In particular, the search module 312 determines one or more state links to include in the search results based on a received search query 122, the device profile 126, and zero or more additional parameters 124.

In some implementations where the search module 312 performs application state searches, the search module 312 can utilize the application state datastore 336 to perform the search. The application datastore 332 may include one or more databases, indices (e.g., inverted indices), files, or other data structures storing this data. The application state datastore 336 includes application state data of different states of applications 110 as well as application data of the corresponding applications 110. The application state data of a state may include keywords appearing at the specified state, one or more resource identifiers (e.g., an application resource identifier) for accessing the state, a state identifier ("state ID"), a screen shot of the state of the application 110, and/or a description of the specified state.

In some implementations, the application state datastore 336 stores the application state data in application state records 338. Each application state record 338 can correspond to a different application state. Thus, an application 110 may have hundreds or thousands of states corresponding thereto. For example, the YELP® application may have a different state record for each entry in the YELP® system. Thus, each restaurant, store, bakery or spa, may have a corresponding application state record 338. Each application state record 338 may include the keywords appearing at the specified state, one or more resource identifiers, descriptions, non-textual information (e.g., screen shots), descriptions of the state, and a state ID. The state ID may be used to identify the application state record 338 from other state records 338 stored in the application state datastore 336. Each application state record 338 may also reference the application record 334 to which the record 338 corresponds or can include the application data of the corresponding application 110 in the application state record 338.

The search module 312 receives a query wrapper 120 that contains a search query 122 and in some scenarios, one or more query parameters 124. The search module 312 may perform various analysis operations on the search query 122. For example, analysis operations performed by the search module 312 may include, but are not limited to, tokenization of the search query 122, filtering of the search query 122, stemming the search query 122, synonymization of the search query 122, and stop word removal. In some implementations, the search module 312 may further generate one or more reformulated search queries based on the search query 122 and the query parameters 124. Reformulated search queries are search queries that are based on some sub-combination of the search query 122 and the query parameters 124.

In some implementations, the search module 312 identifies a consideration set 160 of application states (e.g., a set of application state records 338) based on the search query 122 and, in some implementations, the reformulated queries. The consideration set 160 of application states can identify one or more states of an application 110 as well as the applications 110 themselves. In some examples, the search module 312 may identify the consideration set 160 by identifying application states that correspond to the search query 122 or the reformulated search queries based on matches between terms of the query 122 and terms in the application state data of the application state record 338. For example, the search module 312 may identify a set of state records 338 in the application state datastore 336 based on matches between tokens representing the search query 122 or reformulated queries and words included in the application state records 338, such as words included in the application state information. The consideration set 160 of application states can identify multiple states of a single application 110 and/or application states of different applications 110. For example, the consideration set 160 can identify two different states of a first application 110 and three states of a second application 110.

The search module 312 may be further configured to perform a variety of different processing operations on the consideration set 160 of application states to obtain the search results 130. In some implementations, the search module 312 may generate a result score for each of the application states indicated in the consideration set 160. In some examples, the search module 312 may cull the consideration set 160 based on the result scores of the applications 110 contained therein. The information conveyed in the search results 130 may depend on how the search module 312 calculates the result scores. For example, a result score may indicate the relevance of an application state to the search query 122.

The search module 312 may generate a result score of an application state in a variety of different ways. In general, the search module 312 may generate a result score for an application state based on one or more scoring features. The search module 312 may associate the scoring features with the application 110 and/or the query 122. An application record scoring feature (hereinafter "record scoring feature") may include any data associated with an application state record 338. For example, record scoring features may be based on any data included in the application state information of the application state record. Example record scoring features may be a quality score, whether the application state record 338 includes a resource identifier that leads to a default state or a deeper native application state, and, for newly generated application state records, the number of application state records used to generate the newly generated application state record, as described hereinafter. A query scoring feature may include any data associated with the search query 122. For example, query scoring features may include, but are not limited to, a number of words in the search query 122, the popularity of the search query 122, and the expected frequency of the words in the search query 122. A record-query scoring feature may include any data which may be generated based on data associated with both the application state record 338 and the search query 122 that resulted in identification of the function record by the search module 312. For example, record-query scoring features may include, but are not limited to, parameters that indicate how well the terms of the search query 122 match the terms of the application state information of the identified application state record 338. The search module 312 may generate a result score for function record based on at least one of the record scoring features, the query scoring features, and the record-query scoring features.

The search module 312 may determine a result score based on one or more of the scoring features listed herein and/or additional scoring features not explicitly listed. In some examples, the search module 312 may include one or more machine learned models (e.g., a supervised learning model) configured to receive one or more scoring features. The one or more machine learned models may generate result scores based on at least one of the record scoring features, the query scoring features, and the record-query scoring features. For example, search module 312 may pair the search query 122 with each application state record 338 and calculate a vector of features for each (query, record) pair. The vector of features may include one or more record scoring features, one or more query scoring features, and one or more record-query scoring features. The search module 312 may then input the vector of features into a machine-learned regression model to calculate a result score for the application state record 338. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels. The foregoing is one example manner by which the search module 312 can calculate a result score of an application state record 338.

According to some implementations, the search module 312 can calculate result scores in alternate manners.

In some implementations, the search module 312 may also utilize one or more of the device features 128 in the recreated device profile 128R to determine the result score for the application state record 338. For instance, whether an application 110 corresponding to the application state record 338 is already installed on the user device 200, was recently executed by the user device 200, recently accessed by the user device 200, or was deleted from the user device 200 can influence the result score. For example, if an application 110 is installed on or was recently executed by the user device 200, then the model may determine that the application state record 338 is more relevant to the search query 122 (e.g., the result score is greater than it would have been). Conversely, if the application 110 has been deleted from the user device 200, the model may determine that the application state record 338 is less relevant (e.g., the result score is less than it would have normally been). The search module 312 can feed the device features 128 from the recreated device profile 126r into the machine learned model(s) along with the other features of the application 110.

In other implementations, the search module 312 performs variable boosting on the result scores based on the device features. In these implementations, the search module 312 may implement business rules that take into account the device features. For example, one business rule may instruct the search module 312 to multiply the result score of application states corresponding to an application 110 by a first boosting factor (e.g., 1.3) if the application 110 is installed on the user device 200 and by a second boosting factor (e.g., 1.5) if the application 110 has been recently executed by the user device 200. Another example business rule may instruct the search module 312 to multiply the result score by a third boosting factor (e.g., 0.5) or remove the application states corresponding to the application 110 if the application 110 from the consideration set 160 has been deleted from the user device 200. The foregoing are examples of business rules. The search module 312 may implement additional or alternative business rules.

Once scored, the search module 312 can generate the search results 130 based on the results scores and the application state records 338 to which the results scores correspond. The search module 312 can rank the application state records 338 based on the results scores. In these implementations, a greater result score may indicate that the application state record 338 is more relevant to the search query 122 and/or the query parameters 124 than an application state record 338 having a lesser result score. Additionally or alternatively, the search module 312 can cull the consideration set 160 by removing application state records 338 from the consideration set 160 that have result scores that do not exceed a minimum threshold. The search module 312 can include any remaining applications 110 of the consideration set 160 in the search results 130. Furthermore, the search module 312 can group the application state records 338 according to the application 110 to which the application state records 338 correspond. For instance, if two application state records 338 correspond to a first application 110 and three application state records 338 correspond to a second record, the search module 312 may group two application state records 338 together and the other three applications state records 338 together. The search module 312 may further rank the application state records 338 within the individual groupings.

The search module 312 can generate result objects for each application state records 338 that it determines to include in the search results. The search module 312 can generate a result object for each application state record 338. The result object can include a state link and additional data. The state link can include one or more resource identifiers (e.g., an application resource identifier and/or a web resource identifier) and/or commands for accessing the application state. The search module 312 can obtain the one or more resource identifiers from the application state record 338. The additional data can be textual (e.g., a description of the application state) or non-textual (an icon or screen shot). The search module 312 can obtain the additional data from the application state record 338 or from an application record 334 of the corresponding application 110. In some implementations, the search module 312 generates executable code (e.g., a .JSON file) that contains the search results 130 (e.g., the result objects).

The search module 312 transmits the search results to the user device 200 (from any type of application search). In some implementations, the user device 200 can render the search results into a displayable format. The user device 200 can display the search results 130 via its user interface 240.

Figure 4:
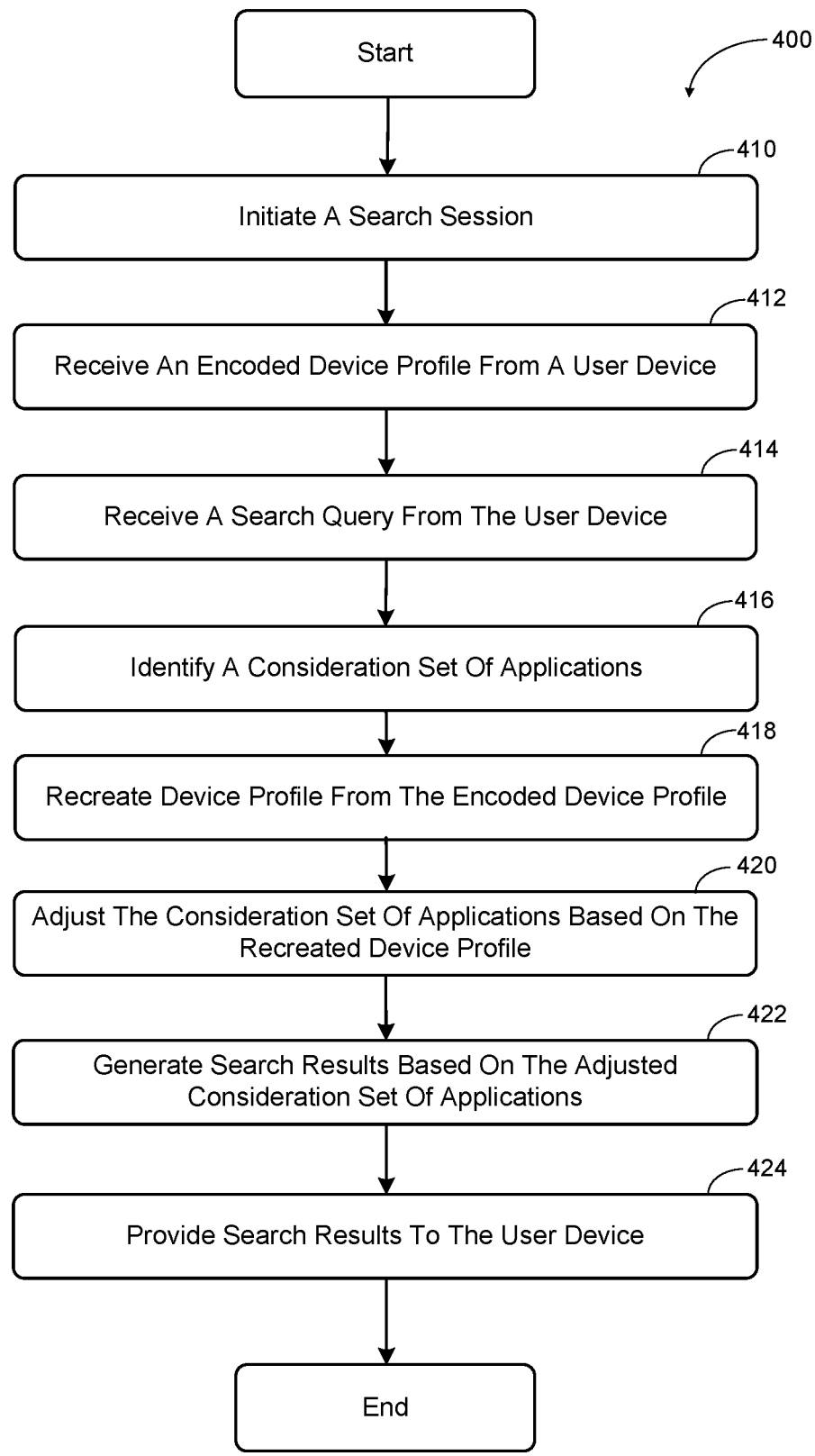
FIG. 4 is a flow chart illustrating an example set of operations for a method for performing a function based application search.

Referring now to FIG. 4, an example set of operations for a method 400 for performing an application search is illustrated. In the example of FIG. 4, the application search is a function based application search. For purposes of explanation, the method 400 is explained with respect to the components of the search engine 300.

At operation 410, the search module 312 initiates a search session. The search module 312 may initiate the search session in response to a request for a search session from a user device 200. The search module 312 can open a new search session and assign a session ID to the new search session. The search module 312 can communicate the session ID to the user device 200, thereby confirming initiation of the search session.

At operation 412, the search module 312 receives an encoded device profile 126e from the user device 200. The user device 200 can transmit the encoded device profile 126e during the initiation of the search session or with a subsequent search query 122 (e.g., in the query wrapper 120 of the search query 122). The encoded device profile 126e indicates one or more device features 128. The device features 128 can include a list of applications 110 that are installed on the user device 200, a list of applications 110 that were recently executed by the user device 200, list of web applications web applications 216 recently accessed by the user device 200, and/or a list of applications 110 that have been deleted from the user device 200.

At operation 414, the search module 312 receives a search query 122 from the user device 200. The user device 200 may include the search query 122 in a query wrapper 120. The user device 200 may further include additional parameter 124 in the query wrapper 120. In some implementations, the user device 200 can provide an encoded device profile 126e in the query wrapper 120.

At operation 416, the search module 312 identifies a considerations set of applications 110. In some implementations, identifies one or more application records 334 from the application datastore 332 based on the search query 122 and zero or more additional query parameters 124, as discussed above (e.g., a function based application search). The consideration set 160 identifies application records that are at least somewhat relevant to the search query 122 and/or one or more of the query parameters 124.

At operation 418, the device profile decoder 314 recreates a device profile 126r of the requesting user device 200 based on the encoded device profile 126e. According to some of these implementations, the encoded device profile 126e includes one or more Bloom filters 260 or a Bloom filter 260 having one or more partitions. In these implementations, each Bloom filter 260 or each partition of a single Bloom filter 260 can indicate a different list of applications 110 (e.g., a list of native applications 218 that are installed on the user device 200, a list of native applications 218 that were recently executed by the user device 200, list of web applications 216 recently accessed by the user device 200, and/or a list of native applications 218 that have been deleted from the user device 200). The device profile decoder 314 can obtain a list of potential applications 110 that indicates one or more applications that could be represented by the Bloom filter 260. In some implementations, the list of potential applications 110 indicates all of the applications 110 represented in the application datastore 332. In other implementations, the device profile decoder 314 utilizes the consideration set 160 to determine the list of potential applications 110. The device profile decoder 314 utilizes the application IDs 266 of the applications 110 indicated in the list of potential applications 110 to query the Bloom filter 260. For each application ID 266, the device profile decoder 314 feeds the application ID 266 to the hash procedure 262 to obtain k index addresses. The device profile decoder 314 checks the values of the elements at the k index addresses. If all of the k elements are equal to one, then the device profile decoder 314 determines that the application 110 corresponding to the application ID 266 was likely included in the list of applications 110 communicated in the encoded device profile 126e. The device profile decoder 314 can add the application 110 to the recreated device profile 126r of the user device 200, as discussed above. The device profile decoder 314 can repeat this process for each application 110 indicated in the list of potential applications 110. In this way, the device profile decoder 314 recreates the device profile 126r thereby identifying at least some of the device features of the user device 200.

In some implementations, the encoded device profile 126e is a compressed device profile. In these implementations, the device profile decoder can decompress the encoded device profile 126 and can recreate the device profile 126r based on the results of the decompression.

At operation 420, the search module 312 adjusts the consideration set 160 based on the recreated device profile 126. In implementations, the search module 312 feeds the device features 128 of the recreated device profile 126r into a machine learned scoring model when scoring each application 110 in the consideration set 160. For each application 110 in the consideration set 160, the search module 312 can feed the device features 128, as they pertain to the application 110 (e.g., whether the application 110 is installed on the user device 200, recently executed by the user device, recently accessed by the user device 200, and/or deleted from the user device 200), into the machine learned scoring model along with application scoring features of the application 110, query scoring feature of the query, and application-query scoring features which relate the search query 122 to the application 110. The machine learned scoring model outputs a result score of the application 110 which takes into account the device features 128 of the user device 126 as they pertain to the application 110.

In other implementations, the search module 312 determines the result scores of each application 110 using the scoring models without taking into account the device features 128 of the user device 200. In these implementations, the search module 312 performs variable boosting on the result scores based on the device features 128 and one or more business rules. For example, the search module 312 can multiply the result score of an application 110 by a first boosting factor (e.g., 0.8), if the application 110 is installed on the user device 200 and/or by a second boosting factor (e.g., 0.3), if the application 110 has been deleted from the user device 200.

The search module 312 can rank the applications 110 in the consideration set 160 based on the results scores thereof. Additionally or alternatively, the search module 312 can cull the consideration set 160 based on the result scores. For example, the search module 312 can remove applications 110 from the consideration set 160 that have result scores that are below a threshold.

At operation 422, the search module 312 generates the search results 130 based on the adjusted consideration set 160. In some implementations, the search module 312 generates result objects using the application data contained in the application 110 records 334 indicated by the consideration set 160. At operation 424, the search module 312 communicates the search results to the user device 200.

Figure 5:
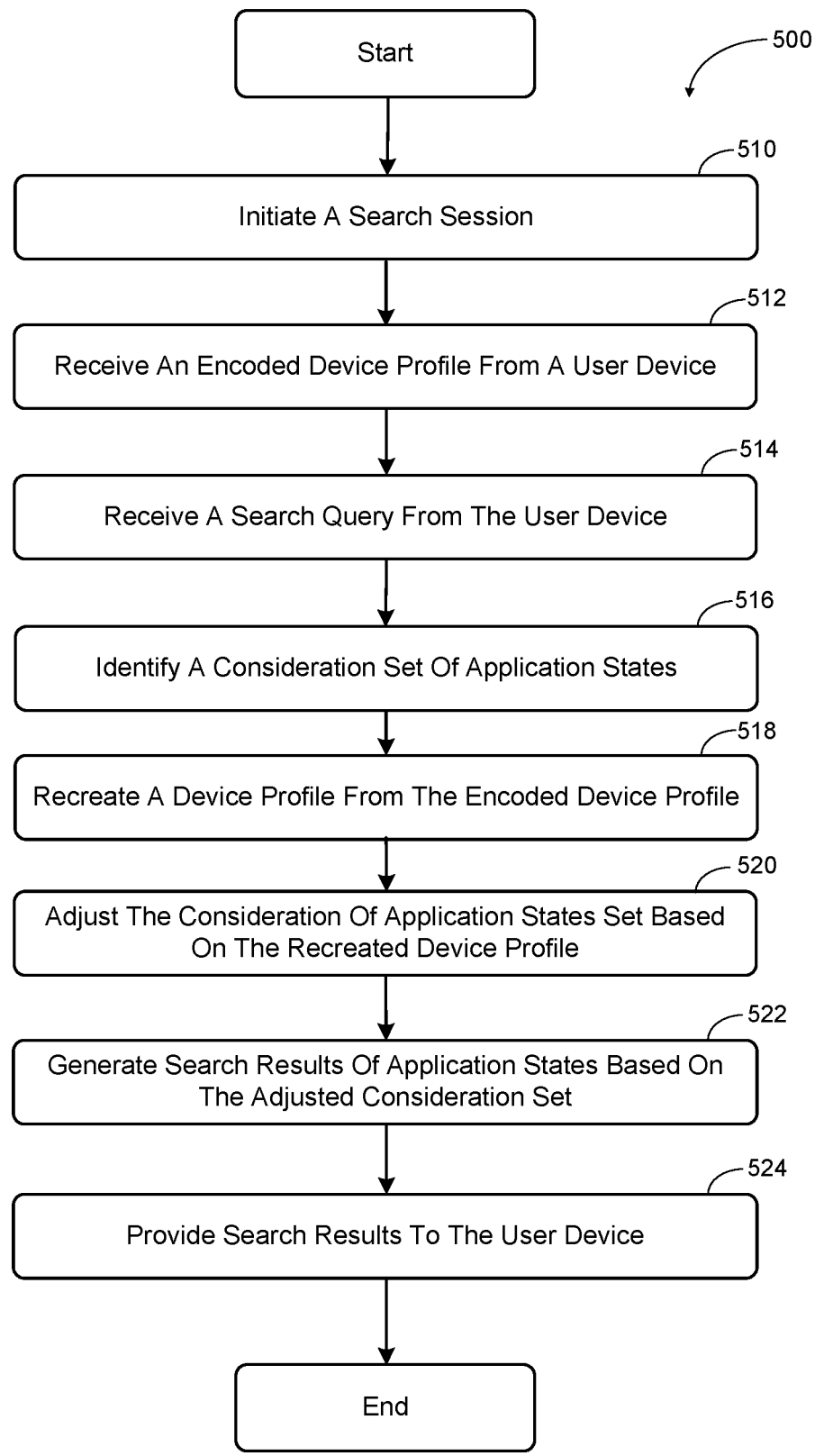
FIG. 5 is a flow chart illustrating an example set of operations for a method for performing an application state search.

Referring now to FIG. 5, an example set of operations for a method 500 for performing an application search is illustrated. In the example of FIG. 5, the application search is an application state search. For purposes of explanation, the method 500 is explained with respect to the components of the search engine 300.

At operation 510, the search module 312 initiates a search session. The search module 312 may initiate the search session in response to a request for a search session from a user device 200. The search module 312 can open a new search session and assign a session ID to the new search session. The search module 312 can communicate the session ID to the user device 200, thereby confirming initiation of the search session.

At operation 512, the search module 312 receives an encoded device profile 126e from the user device 200. The user device 200 can transmit the encoded device profile 126e during the initiation of the search session or with a subsequent search query 122 (e.g., in the query wrapper 120 of the search query 122). The encoded device profile 126e can indicate one or more device features 128. The device features can include a list of applications 110 that are installed on the user device 200, a list of applications 110 that were recently executed by the user device 200, list of web applications 216 recently accessed by the user device 200, and/or a list of applications 110 that have been deleted from the user device 200.

At operation 514, the search module 312 receives a search query 122 from the user device 200. The user device 200 may include the search query 122 in a query wrapper 120. The user device 200 may further include additional parameter 124 in the query wrapper 120. In some implementations, the user device 200 can provide the encoded device profile 126e in the query wrapper 120.

At operation 516, the search module 312 identifies a considerations set of application states. In some implementations, identifies one or more application state records 338 from the application state datastore 336 based on the search query 122 and zero or more additional query parameters 124, as discussed above (e.g., application state search). The consideration set 160 identifies application state records that are at least somewhat relevant to the search query 122 and/or one or more of the query parameters 124.

At operation 518, the device profile decoder recreates a device profile 126r of the requesting user device 200 based on the encoded device profile 126e. In some implementations, the encoded device profile 126e includes one or more Bloom filters 260 or a Bloom filter 260 having one or more partitions. In these implementations, each Bloom filter 260 or each partition of a single Bloom filter 260 can indicate a different list of applications 110 (e.g., a list of applications 110 that are installed on the user device 200, a list of applications 110 that were recently executed by the user device 200, list of web applications 216 recently accessed by the user device 200, and/or a list of applications 110 that have been deleted from the user device 200). The device profile decoder 314 can obtain a list of potential applications 110 that indicates one or more applications 110 that could be represented by the Bloom filter 260. In some implementations, the list of potential applications 110 indicates all of the applications 110 represented in the application datastore 332. In other implementations, the device profile decoder 314 utilizes the consideration set 160 to determine the list of potential applications 110. The device profile decoder 314 utilizes the application IDs 266 of the applications 110 indicated in the list of potential applications to query the Bloom filter 260. For each application ID 266, the device profile decoder 314 feeds the application ID 266 to the hash procedure 262 to obtain k index addresses. The device profile decoder 314 checks the values of the elements at the k index addresses. If all of the k elements are equal to one, then the device profile decoder 314 determines that the application 110 corresponding to the application ID 266 was likely included in the list of applications 110 communicated in the encoded device profile 126e. The device profile decoder 314 can add the application 110 to the recreated device profile 126r of the user device 200, as discussed above. The device profile decoder 314 can repeat this process for each application 110 indicated in the list of potential applications 110. In this way, the device profile decoder 314 recreates the device profile 126r thereby identifying at least some of the device features of the user device 200.

In some implementations, the encoded device profile 126e is a compressed device profile. In these implementations, the device profile decoder can decompress the encoded device profile 126 and can recreate the device profile 126r based on the results of the decompression.

At operation 520, the search module 312 adjusts the consideration set 160 based on the recreated device profile 126. In some implementations, the search module 312 feeds the device features 128 of the recreated device profile 126r into a machine learned scoring model when scoring each application state indicated in the consideration set 160. For each application state indicated in the consideration set 160, the search module 312 can feed the device features 128, as they pertain to the application 110 of the application state (e.g., whether the application 110 is installed on the user device 200, recently executed by the user device, accessed by the user device 200, and/or deleted from the user device 200), into the machine learned scoring model along with record scoring features of the application state, query scoring feature of the query, and application-query scoring features which relate the search query 122 to the application state. The machine learned scoring model outputs a result score of the application state which takes into account the device features as they pertain to the application 110 to which the application state corresponds.

In other implementations, the search module 312 determines the result scores of each application state using the scoring models without taking into account the device features 128 of the user device 200. In these implementations, the search module 312 performs variable boosting on the result scores based on the device features 128 and one or more business rules. For example, the search module 312 can multiply the result score of an application 110 by a first boosting factor (e.g., 1.7), if the application 110 is installed on the user device 200 and/or by a second boosting factor (e.g., 0.4), if the application 110 has been deleted from the user device 200.

The search module 312 can rank the applications 110 in the consideration set 160 based on the results scores thereof. Additionally or alternatively, the search module 312 can cull the consideration set 160 based on the result scores. For example, the search module 312 can remove applications from the consideration set 160 that have result scores that are below a threshold. Furthermore, the search module 312 can group the application state records 338 indicated by the consideration set 160 based on the applications to which the application state records 338 pertain.

At operation 522, the search module 312 generates the search results 130 based on the adjusted consideration set 160. In some implementations, the search module 312 generates result objects using the application state data contained in the application state records 338 indicated by the consideration set 160. In these implementations, the search module 312 can generate a state link for each result object based on the resource identifier(s) contained in the application state record 338. The state links can be included in the respective result objects. At operation 524, the search module 312 communicates the search results to the user device 200.

The methods 400, 500 of FIGS. 4 and 5 are provided for example and not intended to limit the scope of the disclosure. The ordering of the operations described can be altered without departing from the scope of the disclosure. For instance, the recreating the device profile 126r can be performed when the device profile is received or after the consideration set 160 has been identified. In another example, the device profile 126e can be received at the initiation of the search session or with a search query.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, by a processing device, an encoded device profile indicating device features of a user device, wherein the device features indicate one or more native applications installed on the user device;
   identifying, by the processing device, the device features of the user device based on the encoded device profile;
   receiving, by the processing device, a search query from the user device;
   performing, by the processing device, an application search based on the search query to identify a consideration set of records, wherein each record in the consideration set of records corresponds to a respective native application; and
   for each record in the consideration set of records:
      generating, by the processing device, a result score based on at least one of an application scoring feature, a query scoring feature, or an application-query scoring feature, wherein:
         the application scoring feature includes data corresponding to a popularity of each record the consideration set of records,
         the query scoring feature includes at least one of a number of words in the search query, a popularity of the search query, or an expected frequency of words in the search query, and
         the application-query scoring feature includes parameters that indicate a degree of matching between words of the search query and words of each record in the consideration set of records,
      determining, by the processing device, a boosting factor based on the device features of the user device, wherein the boosting factor is a first value in response to the respective native application not being installed on the user device, and wherein the boosting factor is a second value in response to the respective native application being installed on the user device, and
      adjusting, by the processing device, the result score based on the boosting factor,
   generating, by the processing device, search results based on a subset of the consideration set of records, wherein the subset is selected based on the result scores of the consideration set of records, and
   transmitting, by the processing device, the search results to the user device.

* * * * *